(12) United States Patent
Drobnik

(10) Patent No.: US 6,344,987 B1
(45) Date of Patent: *Feb. 5, 2002

(54) METHOD AND APPARATUS FOR DISTRIBUTING POWER IN HIGH FREQUENCY ALTERNATING CURRENT AND DIRECT CURRENT

(75) Inventor: Josef C. Drobnik, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/527,559

(22) Filed: Mar. 16, 2000

(51) Int. Cl.⁷ .............................. H02M 7/00; H02M 1/10
(52) U.S. Cl. ........................................ 363/123; 363/142
(58) Field of Search ................................. 363/123, 142

(56) References Cited

U.S. PATENT DOCUMENTS

| | | | | |
|---|---|---|---|---|
| 3,769,571 A | * | 10/1973 | Wilikinson | 363/134 |
| 3,815,009 A | * | 6/1974 | Berger | 363/20 |
| 4,162,522 A | * | 7/1979 | Moerman | 363/171 |
| 5,574,748 A | * | 11/1996 | Vander Mey et al. | 375/204 |
| 5,714,864 A | * | 2/1998 | Rose et al. | 320/2 |
| 5,824,990 A | * | 10/1998 | Geisler et al. | 219/130.21 |
| 5,901,056 A | * | 5/1999 | Hung | 363/142 |
| 5,982,652 A | * | 11/1999 | Simonelli et al. | 363/142 |
| 6,055,165 A | * | 4/2000 | Drobnik | 363/44 |
| 6,137,706 A | * | 10/2000 | Nesbit | 363/142 |
| 6,160,374 A | * | 12/2000 | Hayes et al. | 320/108 |

* cited by examiner

*Primary Examiner*—Bao Q. Vu
(74) *Attorney, Agent, or Firm*—Blakely, Sokoloff, Taylor & Zafman LLP

(57) ABSTRACT

A method for distributing power in an electronic system comprising of receiving power in a first domain at a connector of a peripheral device and converting the power to a second domain at the connector of the peripheral device is disclosed.

22 Claims, 6 Drawing Sheets

METHOD AND APPARATUS FOR DISTRIBUTING POWER IN HIGH FREQUENCY ALTERNATING CURRENT AND DIRECT CURRENT

FIELD OF THE INVENTION

The present invention relates to the field of power distribution in computer systems. More specifically, the present invention relates to an alternating current (AC) and a direct current (DC) power distribution system.

BACKGROUND OF THE INVENTION

One known approach used for distributing power from a power source to components on a computer system is the direct current (DC) power distribution system. The DC power distribution system typically includes a main power supply, voltage regulator modules, and connectors that couple the main power supply to the voltage regulator modules. The main power supply converts low frequency (approximately 50–60 Hz) AC power received from the power source into DC power. The main power supply then converts the DC power into high frequency AC power. The high frequency AC power is then stepped down, converted back to DC power, and filtered before being transmitted along a connector to a voltage regulator module corresponding to a component on the computer system. At the voltage regulator module (VRM), the DC power is converted to AC power, stepped down, converted to DC power and filtered before being delivered to a component on the computer system.

A drawback of the DC distribution system was that it imposed dual conversion on the power conversion chain. Dual power conversion added complexity as well as cost and parts-count to the distribution system. Furthermore, the dual power conversion reduced the efficiency of the distribution system. In addition, today's computer systems are being designed with more stringent power specifications. These specifications require increased slew rates (change of current over time). Current DC distribution systems have experienced difficulties in reliably supporting these requirements.

Additionally, each VRM includes a controller monitor and regulates power output. Since each VRM has its own controller, the system does not have a centralized controller to regulate output power further adding complexity and circuitry. Another drawback of the known approach is that power to the processor is static and does not vary depending upon the power needs of the processor.

One solution to the drawbacks of the DC distribution system is a high-frequency alternating current (HFAC) distribution system. An advantage of HFAC distribution system includes no need for dual power conversion on the power conversion chain, thereby, reducing the complexity as well as cost and parts-count to the distribution system. Another advantage of HFAC power distribution system includes, increased efficiency of the distribution system in today's computer systems being designed with more stringent power specifications, specifically, slew rates (change of current over time) are increased.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

As technology moves toward utilization of HFAC power distribution, DC power distribution in computer systems is likely to become obsolete. The vast majority of existing computer systems, and computer systems sold in the near future, however, will likely continue to use DC power distribution. In order to promote HFAC market penetration, a need exists to support both HFAC and DC power distribution.

The present invention provides power connectors that allow DC and HFAC power distribution peripheral devices to be used in the same computer system.

Figure 1:
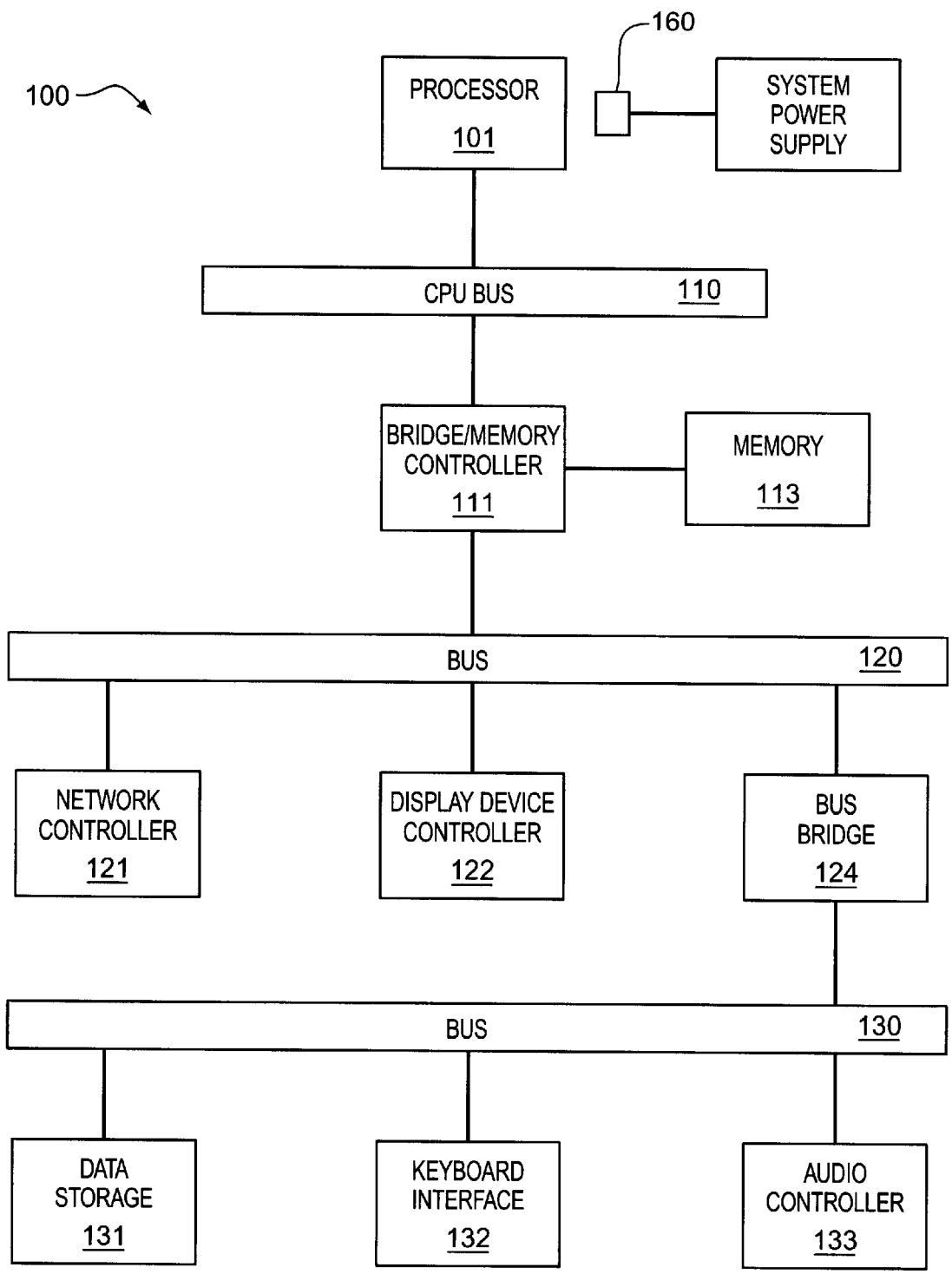
FIG. 1 illustrates a computer system 100 upon which an embodiment of the present invention can be implemented.

FIG. 1 illustrates a computer system 100 upon which an embodiment of the present invention can be implemented. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a synchronous direct random access memory (SDRAM) device, or other memory device. The memory 113 may store instructions and code represented by data signals that may be executed by the processor 101.

A bridge/memory controller 111 is coupled to the CPU bus 110 and the memory 113. The bridge/memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device controller 122 may be a monochrome display adapter (MDA) card, a color graphics adapter (CGA) card, an enhanced graphics adapter (EGA) card, an extended graphics array (XGA) card or other display device controller. The display device (not shown) may be a television set, a computer monitor, a flat panel display or other display device. The display device receives data signals from the processor 101 through the display device controller 122 and displays the information and data signals to the user of the computer system 100.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard (not shown) to the computer system 100 and transmits data signals from a keyboard to the computer system 100. An audio controller 133 is coupled to the second I/O bus 130. The audio controller 133 operates to coordinate the recording and playing of sounds.

A bus bridge 124 couples the first 110 bus 120 to the second I/O bus 130. The bus bridge 124 operates to buffer and bridge data signals between the first I/O bus 120 and the second I/O bus 130.

The computer system 100 includes a system power supply 150. The system power supply 150 receives power from a power source such as a wall socket (not shown) or other power source. The system power supply 150 can supply power to various peripheral devices in the computer system 100. For instance, in the illustrated embodiment, the system power supply 150 connects to the processor through a connector 160. According to the teachings of the present invention, the type of connector 160 will depend upon the type of power signal provided by the system power supply 150 and the type of power signal required by the computer system 100.

Figure 2:
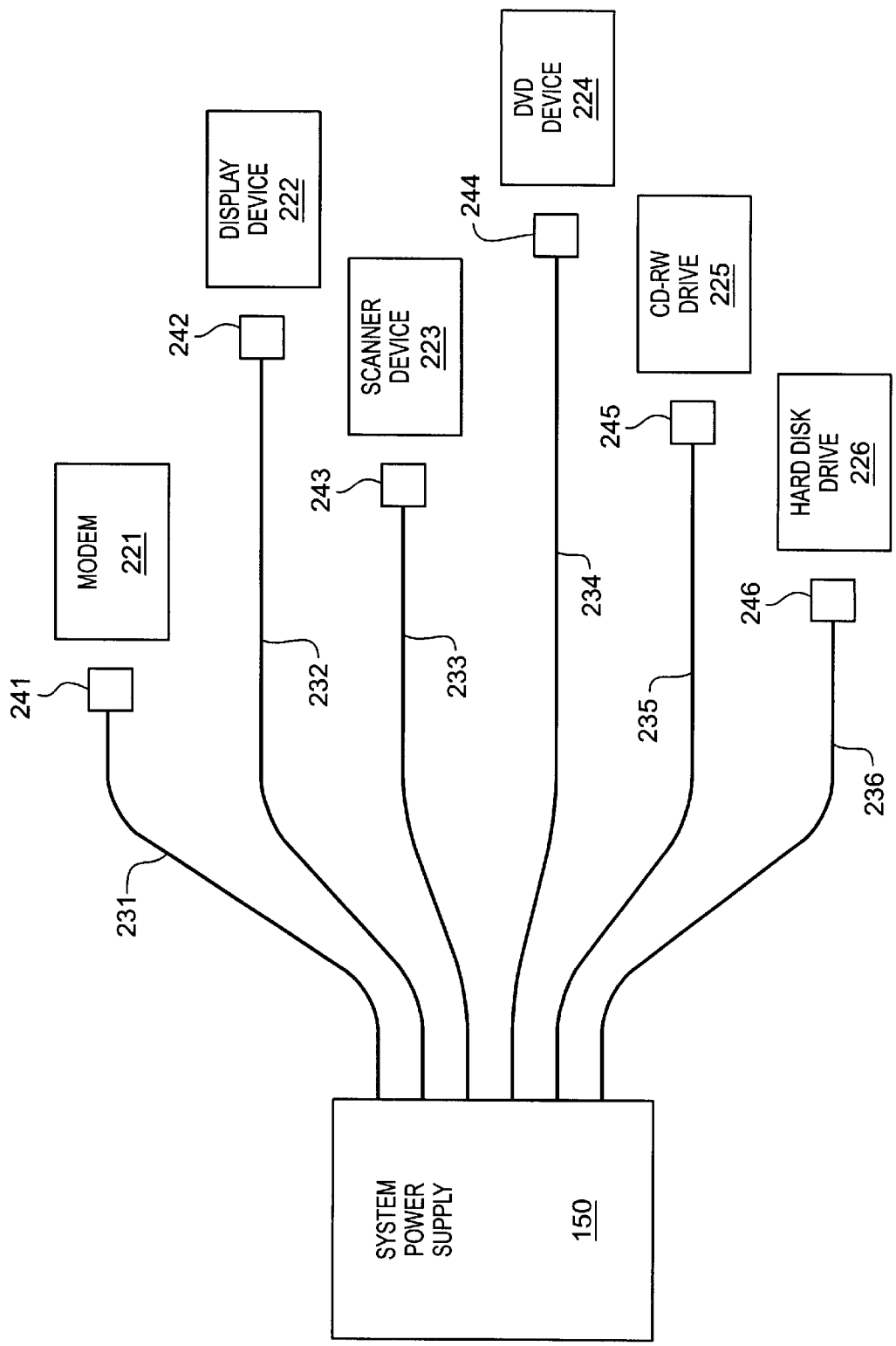
FIG. 2 illustrates peripheral devices of a computer system connected together in a hub topology and powered by the system power supply incorporating an embodiment of the present invention.

FIG. 2 illustrates peripheral devices of a computer system connected together in a hub topology and powered by the system power supply. In FIG. 2, the system power supply 150 provides power signals to a number of peripheral devices 221–226 through several power signal lines 231–236 in the hub topology. According to the teachings of the present invention, the power signal lines 231–236 provide power signals to the peripheral devices 221–226 through inventive connectors 241–246. The peripheral devices 221–226 may require high-frequency alternating current (HFAC) power signals or traditional direct current (DC) power signals. Additionally, the power supply 150 may provide HFAC or traditional DC power signals. It should be appreciated that the connectors 241–246 will allow the use of both HFAC and traditional DC power signals for the peripherals 221–226 consistent with the present invention. Furthermore, shown in FIG. 2, the peripheral devices include a modem 221, a display device 222, a scanner device 223, digital video disk (DVD) device 224, a compact disk rewritable (CD-RW) drive 225, and a hard disk drive 226, however, it should be appreciated that the peripheral devices may include any other type of peripheral devices known in the art.

Figure 3:
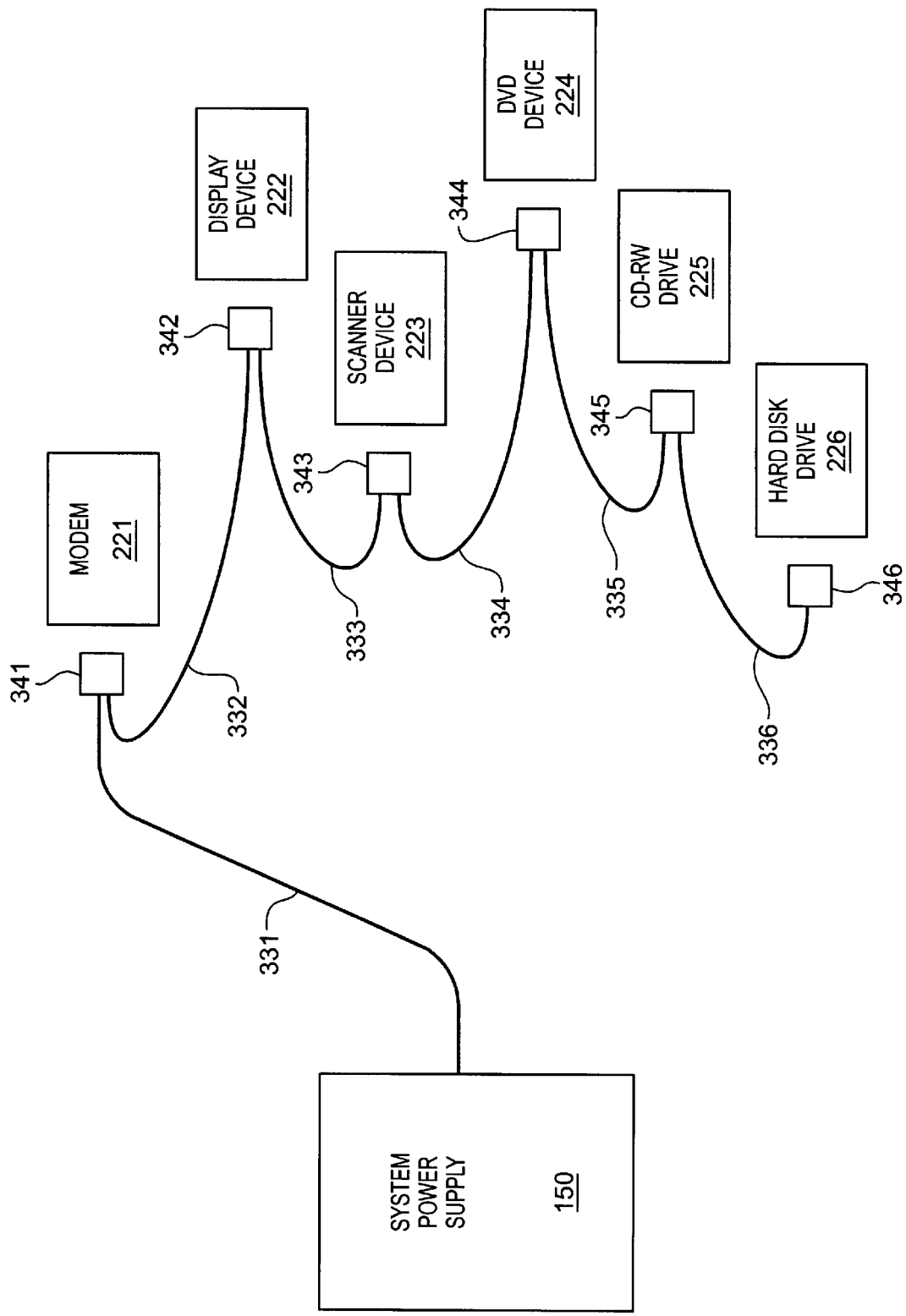
FIG. 3 illustrates peripheral devices of a computer system connected together in a daisy-chain topology and powered by the system power supply incorporating an embodiment of the present invention.

FIG. 3 illustrates peripheral devices of a computer system connected together in a daisy-chain topology and powered by the system power supply incorporating an embodiment of the present invention. In FIG. 3, through a single power signal line 331, the system power supply 150 provides power signals to the number of peripheral devices 221–226 in the daisy-chain topology. In FIG. 3, through a single line 331, the peripheral devices 221–226 receive power signals from the system power supply 150. Incorporating an embodiment of the present invention, the power signal line 331 provides power signals to the peripheral devices 221–226 through connectors 341–346. The daisy-chain topology requires the connectors 341–346 to be connected to each other through lines 332–336. Similarly, the peripheral devices 221–226 may require high-frequency alternating current (HFAC) power signals or traditional direct current (DC) power signals. Additionally, the power supply 150 may provide HFAC or traditional DC power signals. It should be appreciated that the connectors 341–346 will allow the use of both HFAC and traditional DC power signals for the peripherals 221–226 consistent with the present invention. Furthermore, shown in FIG. 3, the peripheral devices include a modem 221, a display device 222, a scanner device 223, digital video disk (DVD) device 224, a compact disk rewritable (CD-RW) drive 225, and a hard disk drive 226, however, it should be appreciated that the peripheral devices may include any other type of peripheral devices known in the art.

Figure 4:
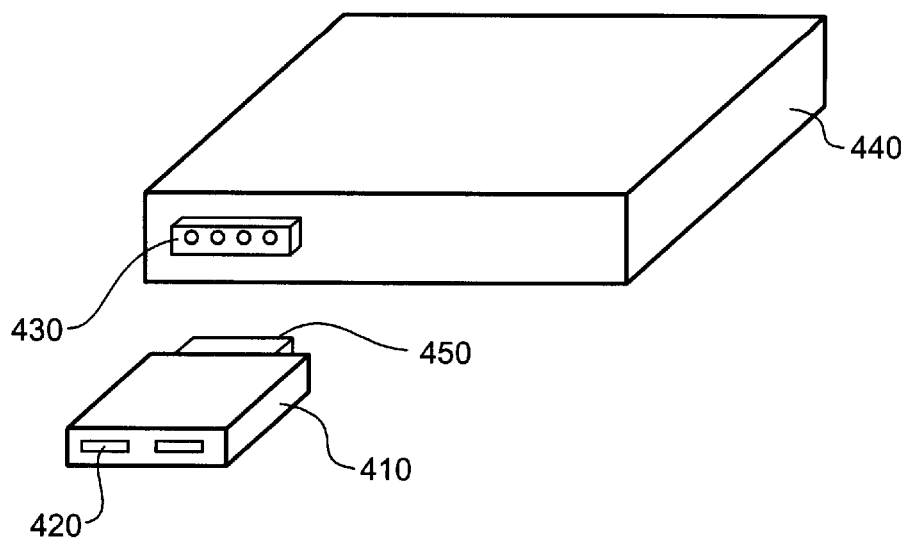
FIG. 4 illustrates a detailed view of a connector and a peripheral device in accordance with an embodiment of the present invention.

FIG. 4 illustrates a detailed view of a connector and a peripheral device in accordance with an embodiment of the present invention. Shown in FIG. 4, a peripheral device 440 requires a traditional DC power signal, and the peripheral device 440 has a connection point 430 configured to accept the traditional DC power signal. In accordance with the present invention, the connector 410 is configured to connect with the peripheral device 440 through a connection point 450. In FIG. 4, the system power supply connection side 420 of the connector 410 is shown configured to accept a HFAC power signal from the system power supply 150. The one embodiment of the present invention shown in FIG. 4 permits the system power supply 150 to provide HFAC power signal to the connector 410 through the system power supply connection side 420 of the connector 410, and the connector 410 converts the HFAC power signal to the traditional DC power signal for the peripheral device 440. The traditional DC power signal is provided to the peripheral device 440 through the connection point 450 on the connector 410 and the connection point 430 on the peripheral device.

Shown in FIG. 4, the illustrated embodiment of the present invention permits the system power supply 150 to provide HFAC power signal to the peripheral device 440 utilizing traditional DC power signal with the conversion from HFAC power signal to traditional DC power signal performed in the connector 410. Thus, it will be appreciated by those skilled in the art that the present invention allows the provision of one type of power signal for a peripheral device that requires a different type of power signal. Additionally, it should be appreciated that the connector 410 shown in FIG. 4 can be used in several different embodiments, such as those shown in FIGS. 1, 2, and 3.

Figure 5:
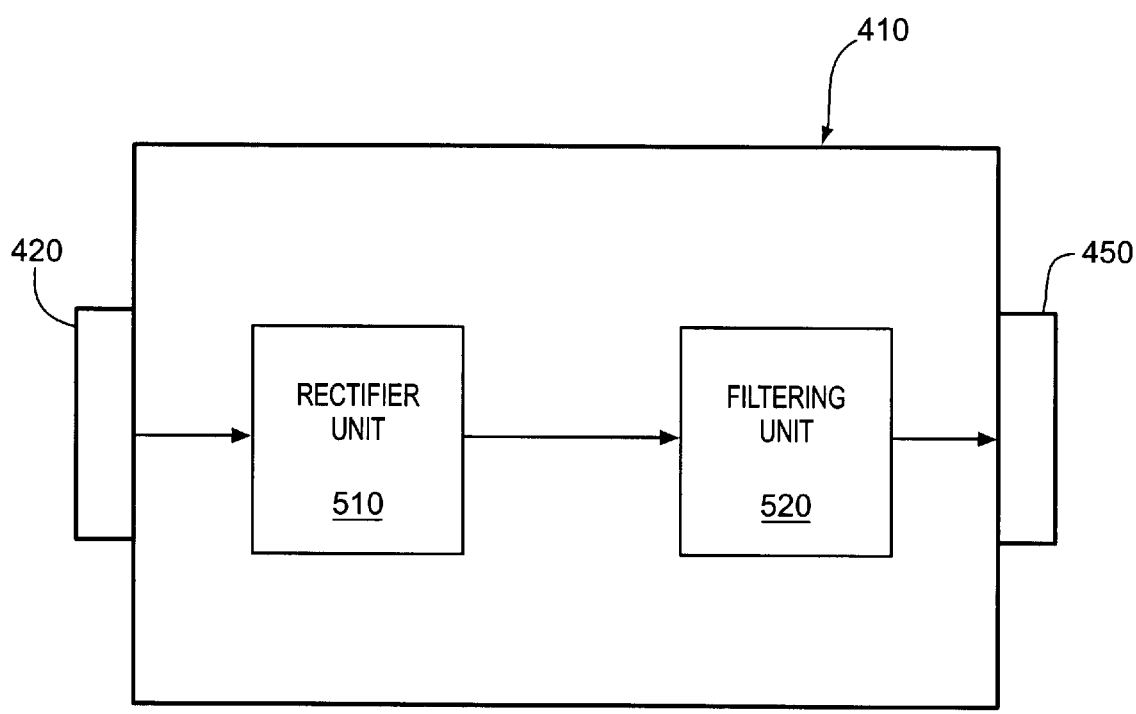
FIG. 5 is a block diagram of one embodiment of the connector shown in FIG. 4 according to the teachings of the present invention.

FIG. 5 is a block diagram of one embodiment of the connector shown in FIG. 4 according to the teachings of the present invention. In FIG. 5, a HFAC power signal is received at the system power supply connection side 420 of the connector 410. Shown in FIG. 5, a rectifier unit 510 receives the HFAC power signal from the system power supply 150 and converts the signal component of the HFAC power into an output power signal in the traditional DC domain. In an alternate embodiment, a step down transformer (not shown) may be included as part of the rectifier unit 510 to step down the HFAC power signal to a lower power level.

Additionally, shown in FIG. 5, a filtering unit 520 is coupled to the rectifier unit 510. The filtering unit 520 receives the DC power signal from the rectifier unit 510 and filters away ripple from the traditional DC power signal before transmitting the power signal to the connection point 450 on the connector 410.

The system power supply connection side 420, rectifier unit 510, filtering unit 520, and the connection point 450 may be implemented using any known circuitry technique. According to an embodiment of the present invention, the rectifier unit 510 and the filtering unit 520 may all reside on a single semiconductor substrate, be discrete components, or be a combination of both.

The connector 410 allows the use of HFAC power signal from the system power supply 150 by a peripheral device 440 requiring traditional DC power signal in accordance with the present invention.

Figure 6:
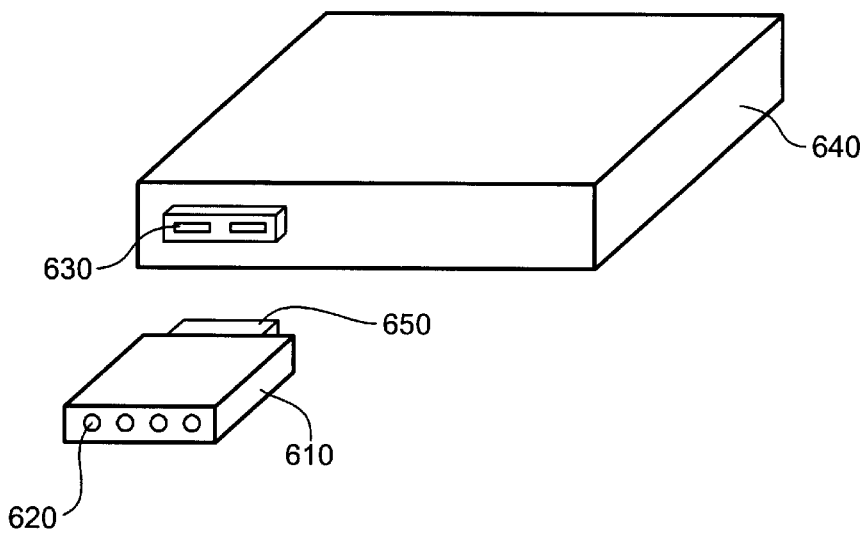
FIG. 6 illustrates a detailed view of connector and a peripheral device in accordance with an alternate embodiment of the present invention.

FIG. 6 illustrates a detailed view of a connector and a peripheral device in accordance with an alternate embodiment of the present invention. Shown in FIG. 6, a peripheral device 640 requires HFAC power signal, and the peripheral device 640 has a connection point 630 configured to accept the HFAC power signal. In accordance with the present invention, the connector 610 is configured to connect with the peripheral device 640 through a connection point 650. In FIG. 6, the system power supply connection side 620 of the connector 610 is shown configured to accept a traditional DC power signal from the system power supply 150. The embodiment of the present invention shown in FIG. 6 permits the system power supply 150 to provide traditional DC power signal to the connector 610 through the system power supply connection side 620 of the connector 610, and the connector 610 converts the traditional DC power signal to the HFAC power signal for the peripheral device 640. The HFAC power signal is provided to the peripheral device 640 through the connection point 650 on the connector 610 and the connection point 630 on the peripheral device.

Shown in FIG. 6, the illustrated embodiment of the present invention permits the system power supply 150 to provide traditional DC power signal to the peripheral device 640 utilizing HFAC power signal with the conversion from traditional DC power signal to HFAC power signal performed in the connector 610. Thus, it will be appreciated by those skilled in the art that the present invention allows the provision of one type of power signal for a peripheral device that requires a different type of power signal. Additionally, it should be appreciated that the connector 610 shown in FIG. 6 can be used in several different embodiments, such as those in FIGS. 1, 2, and 3.

Figure 7:
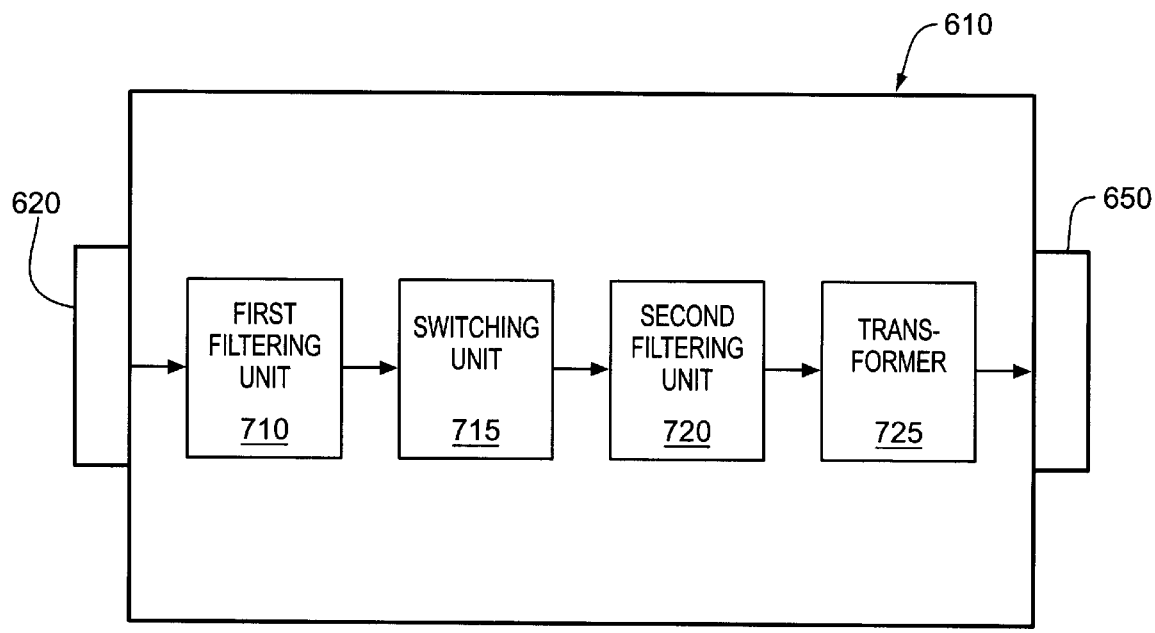
FIG. 7 is a block diagram of one alternate embodiment of the connector shown in FIG. 6 according to the teachings of the present invention.

FIG. 7 is a block diagram of one embodiment of the connector shown in FIG. 6 according to the teachings of the present invention. In FIG. 7, a traditional DC power signal is received that the system power supply connection side 620 of the connector 610. Shown in FIG. 7, a first filter unit 710 receives the traditional DC power signal and reduces ripple in the traditional DC power signal preventing the transmission of noise generated by the system power supply 150. A switching unit 715 is coupled to the first filter unit 710, and the switching unit 715 receives the traditional DC power signal from the filtering unit 710 and converts the traditional DC power signal to HFAC power signal.

In FIG. 7, a second filtering unit 720 is coupled to the switching unit 715. The second filtering unit 720 receives the HFAC power signal from the switching unit 715 and filters away ripple from the HFAC power signal. Additionally, shown in FIG. 7, a transformer unit 725 is coupled to the second filtering unit 720. The transformer unit 725 receives the HFAC power signal from the second filtering unit 720 and steps the HFAC power signal down to a lower level before transmitting the HFAC power signal to the connection point 650 on the connector 610.

The system power supply connection side 620, first filtering unit 710, switching unit 715, second filtering unit 720, transformer 725, and the connection point 650 may be implemented using any known circuitry technique. According to an embodiment of the present invention, the first filtering unit 710, switching unit 715, second filtering unit 720, and the transformer 725 may all reside on a single semiconductor substrate, be discrete components, or be a combination of both.

The connector 610 allows the use of traditional DC power signal from the system power supply 150 by a peripheral device 640 requiring HFAC power signal in accordance with the present invention.

Figure 8:
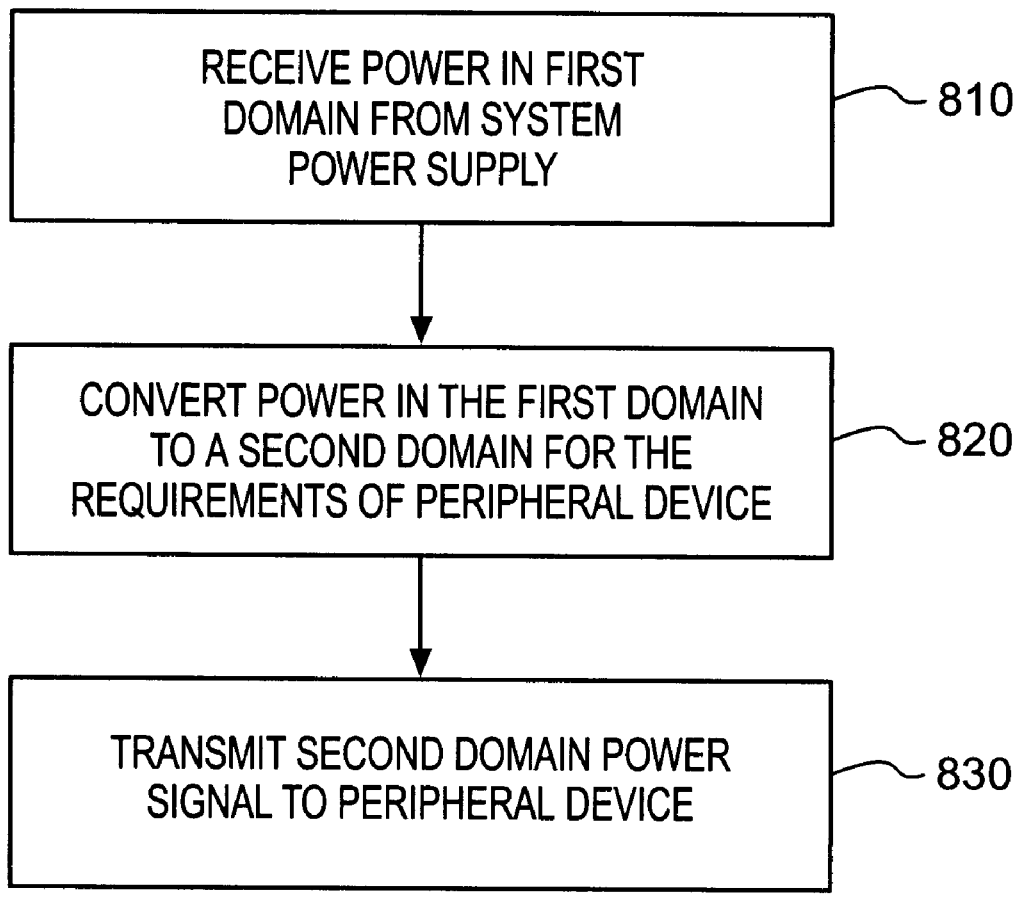
FIG. 8 is flow chart illustrating a method for converting power signals at connectors according to an embodiment of the present invention.

FIG. 8 is flow chart illustrating a method for converting power signals at connectors according to an embodiment of the present invention. Power signal in one domain is received from a system power supply at a connector of a peripheral device 810. The connector converts the power in the first domain to a second domain to meet the requirements of the peripheral device 820. The power signal in the second domain is transmitted to the peripheral device 830.

Thus, a method and apparatus for utilizing two different domain power signals is described.

In the forgoing description, the invention is described with reference to specific exemplary embodiments thereof. It will, however, be evident that various modifications and changes may be made thereto without departing from the broader spirit and scope of the present invention as set forth in the appended claims. The specifications and drawings are accordingly to be regarded in an illustrative rather than in a restrictive sense.

What is claimed is:

1. A method for distributing power, comprising:

receiving a high frequency alternating current (HFAC) domain power signal at a connector of a peripheral device in an electronic system; and converting said HFAC domain power signal to a direct current (DC) domain power signal at said connector of said peripheral device.

2. The method of claim 1, wherein said converting further comprises:

stepping down said power; and rectifying said power from said HFAC domain power signal to said DC domain power signal.

3. The method of claim 2, wherein said converting further comprises filtering an output of said DC domain power signal.

4. A system power supply connector of an electronic system comprising:

an input port to receive a high frequency alternating current (HFAC) domain power signal;

a plurality of circuit components to convert said HFAC domain power signal to a direct current (DC) domain power signal; and an output port to transmit said DC domain power signal.

5. The system power supply connector of claim 4, wherein said plurality of circuit components comprises:

a rectifier unit; and a filtering unit.

6. An electronic system comprising:

a system power supply that transmits a high frequency alternating current (HFAC) domain power signal on a power signal line;

one or more connectors, coupled to said power signal line, that converts said HFAC domain power signal to direct current (DC) domain power signal; and one or more peripheral devices, coupled to said one or more connectors, that receives said DC domain power signal.

7. A method for distributing power comprising:

receiving a direct current (DC) domain power signal at a connector of a peripheral device in an electronic system; and converting said DC domain power signal to a high frequency alternating current (HFAC) domain power signal at said connector of said peripheral device.

8. The method of claim 7, wherein said converting further comprises:

smoothing an output of said power in said HFAC domain power signal; and stepping down said HFAC domain power signal.

9. A system power supply connector of an electronic system comprising:

an input port to receive a direct current (DC) domain power signal;

a plurality of circuit components to convert said DC domain power signal to a high frequency alternating current (HFAC) domain power signal; and an output port to transmit said HFAC domain power signal.

10. The system power supply of claim 9, wherein said plurality of circuit components comprises:

a first filter unit;

a switching unit;

a second filtering unit; and a transformer.

11. An electronic system comprising:

a system power supply that transmits a direct current (DC) domain power signal on a power signal line;

one or more connectors, coupled to said power signal line, that converts said DC domain power signal to a high frequency alternating current (HFAC) domain power signal; and one or more peripheral devices, coupled to said one or more connectors, that receives said HFAC domain power signal.

12. A method for distributing power, comprising:

receiving a high frequency alternating current (HFAC) domain power signal at a connector of a peripheral device in a computer system; and converting said HFAC domain power signal to a direct current (DC) domain power signal at said connector of said peripheral device.

13. The method of claim 12, wherein said converting further comprises:

stepping down said power; and rectifying said power from said HFAC domain power signal to said DC domain power signal.

14. The method of claim 13, wherein said converting further comprises filtering an output of said DC domain power signal.

15. A system power supply connector of a computer system comprising:

an input port to receive a high frequency alternating current (HFAC) domain power signal;

a plurality of circuit components to convert said HFAC domain power signal to a direct current (DC) domain power signal; and an output port to transmit said DC domain power signal.

16. The system power supply connector of claim 15, wherein said plurality of circuit components comprises:

a rectifier unit; and a filtering unit.

17. A computer system comprising:

a system power supply that transmits a high frequency alternating current (HFAC) domain power signal on a power signal line;

one or more connectors, coupled to said power signal line, that converts said HFAC domain power signal to a direct current (DC) domain power signal; and one or more peripheral devices, coupled to said one or more connectors, that receives said DC domain power signal.

18. A method for distributing power, comprising:

receiving a direct current (DC) domain power signal at a connector of a peripheral device in a computer system; and converting said DC domain power signal to a high frequency alternating current (HFAC) domain power signal at said connector of said peripheral device.

19. The method of claim 18, wherein said converting further comprises:

smoothing an output of said power in said HFAC domain power signal; and stepping down said HFAC domain power signal.

20. A system power supply connector of a computer system comprising:

an input port to receive a direct current (DC) domain power signal;

a plurality of circuit components to convert said DC domain power signal to a high frequency alternating current (HFAC) domain power signal; and an output port to transmit said HFAC domain power signal.

21. The system power supply of claim 20, wherein said plurality of circuit components comprises:

a first filter unit;

a switching unit;

a second filtering unit; and a transformer.

22. A computer system comprising:

a system power supply that transmits a direct current (DC) domain power signal on a power signal line;

one or more connectors, coupled to said power signal line, that converts said DC domain power signal to a high frequency alternating current (HFAC) domain power signal; and one or more peripheral devices, coupled to said one or more connectors, that receives said HFAC domain power signal.

* * * * *

UNITED STATES PATENT AND TRADEMARK OFFICE
CERTIFICATE OF CORRECTION

PATENT NO. : 6,344,987 B1
DATED : February 5, 2002
INVENTOR(S) : Drobnik

It is certified that error appears in the above-identified patent and that said Letters Patent is hereby corrected as shown below:

<u>Column 3,</u>
Line 66, delete "110" and insert -- I/O --.

Signed and Sealed this

Twelfth Day of November, 2002

Attest:

Attesting Officer

JAMES E. ROGAN
*Director of the United States Patent and Trademark Office*